Figure 1:
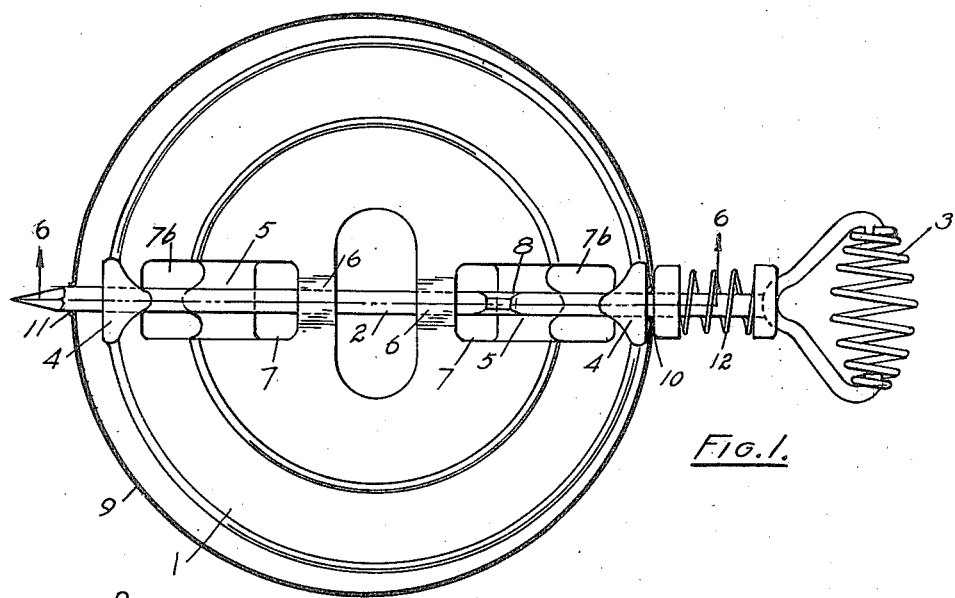

May 24, 1938.  C. R. ANDERSON  2,118,752
DAMPER
Filed March 3, 1937  2 Sheets-Sheet 1

Carl R. Anderson
INVENTOR.

BY
ATTORNEYS.

Carl R. Anderson
INVENTOR.

BY
ATTORNEYS.

Patented May 24, 1938

2,118,752

UNITED STATES PATENT OFFICE 2,118,752

DAMPER

Carl R. Anderson, Erie, Pa., assignor to The Griswold Manufacturing Company, Erie, Pa., a corporation of Pennsylvania Application March 3, 1937, Serial No. 128,823

2 Claims. (Cl. 126—292)

This invention relates to dampers and is in the nature of an improvement on the damper illustrated in the patent to Massing, 1,146,807 dated July 20, 1915, and the damper as illustrated in my application 35,782 filed August 12, 1935. In these patents the damper is provided with a rod receiving passage and a damper rod is provided with a shoulder which can be worked through the pipe in which the damper is placed, entered along the passage and turned so as to seat the shoulder against a locking surface along the passage to lock the rod with the damper. A spring is ordinarily provided to retract the rod so as to assure the retention of this locking condition. The damper rods are commonly provided with points and the perforation through the pipe may be formed by this point. In fact usually is so formed. If the shoulder is formed by a bend or loop in the rod it can be worked through the perforation in the pipe through which it is entered by tipping the damper to accommodate the bends of the loop, provided the entrance end or point of the rod is so distant from the loop as to permit the swinging of the rod in the pipe during the passage of the loop or shoulder through the pipe perforation, and the point may be then forced through the outgoing side of the pipe by a direct crosswise movement, this endwise movement carrying the shoulder well into the damper plate so as to provide a proper engagement of the locking surfaces.

Dampers have been arranged with the rods so proportioned with relation to the shoulder and the point that the point may make its perforation at the outgoing side of the pipe prior to the entrance of the shoulder through the perforation, and shoulders have been formed requiring an enlargement of the hole of the perforation at the ingoing side sufficient to permit of the direct passage of the shoulder through the opening in the ingoing side of the pipe and directly through the outgoing side of the pipe, but such shoulders make the ingoing perforation oversize and thus provide a less desirable bearing for the rod. In the present invention, by making the proportions so that a bent shoulder may be worked through the ingoing perforation without undue enlargement, a better bearing in the pipe is provided for the rod and at the same time the pointed end of the rod may be worked through the outgoing side of the pipe free from any interference of the shoulder with the pipe or damper during the working of the point through the outgoing side of the pipe. Features and details of the invention will be further described in the specification and claims.

A preferred embodiment of the invention is illustrated in the accompanying drawings as follows:

Fig. 1 shows a plan view of the pipe.

Figure 2:
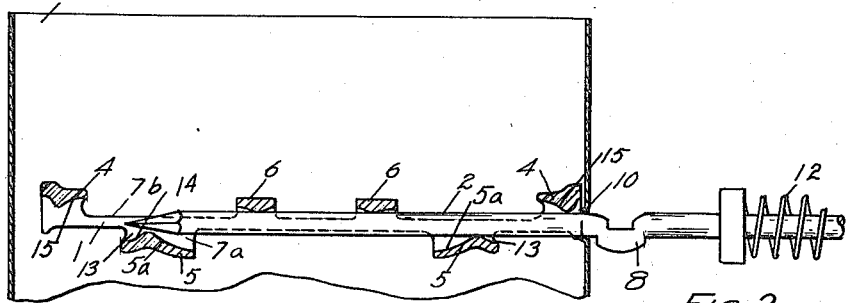

Fig. 2 a section on the line 6—6 in Fig. 1 but with the rod partially entered, the shoulder outside the pipe.

Figure 3:
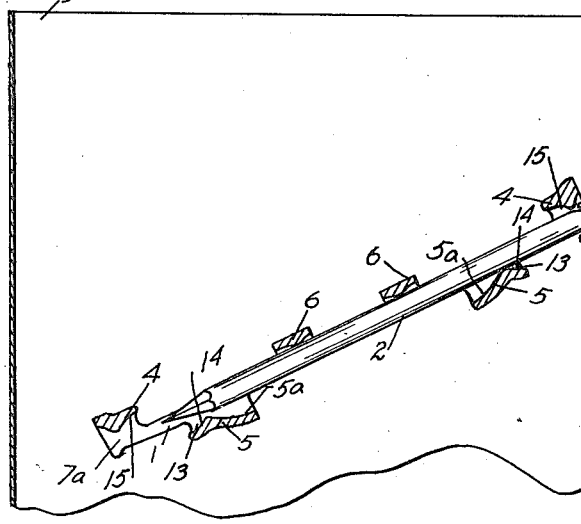

Fig. 3 a similar section but with the rod tilted to accommodate the bend forming the shoulder.

Figure 4:
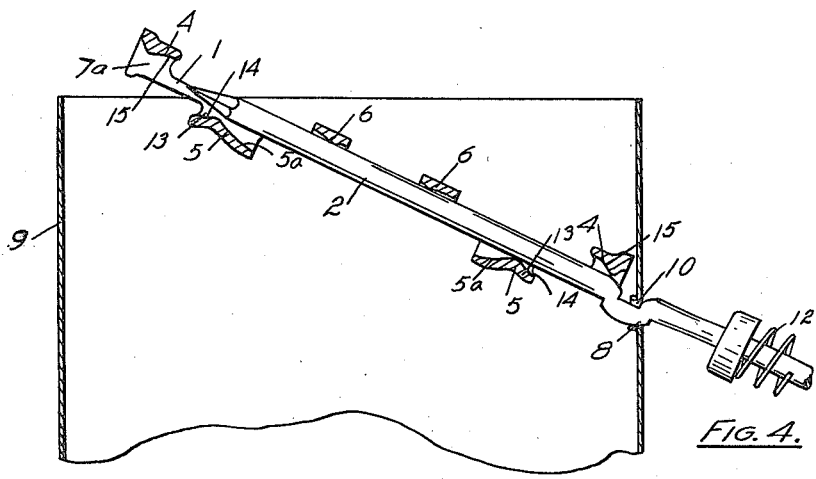

Fig. 4 a similar section showing a further tilting movement accommodating the bend of the shoulder as it passes the perforation.

Figure 5:
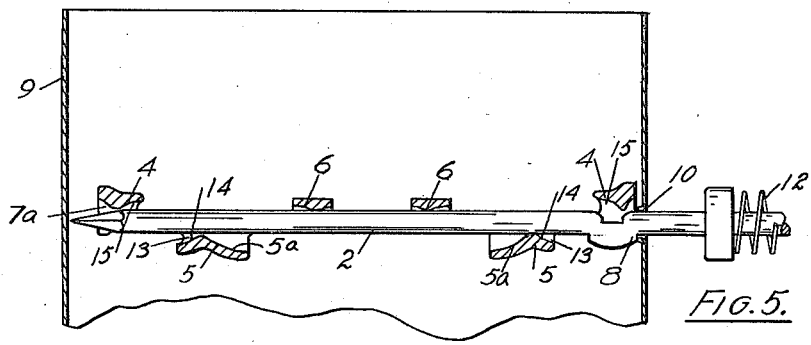

Fig. 5 shows the bend entered through the ingoing side of the pipe and the rod in position to perforate the outgoing side of the pipe.

Figure 6:
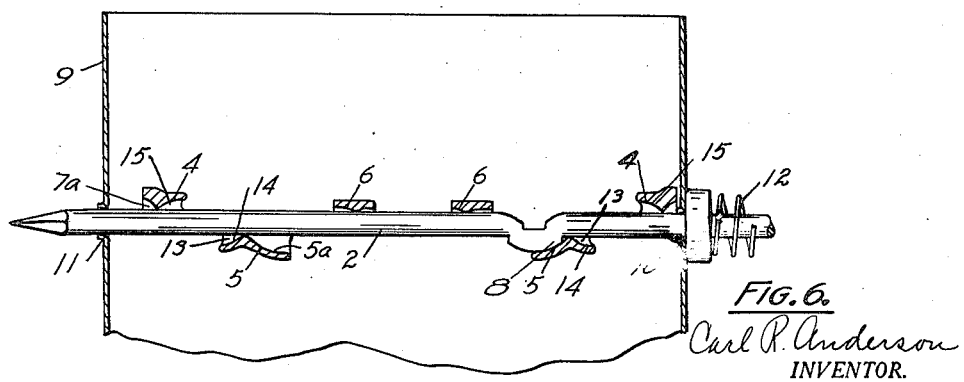

Fig. 6 a section on the line 6—6 in Fig. 1 showing the rod in its final assembled position.

1 marks a damper plate, 2 a damper rod, 3 a handle for the rod, 4, 5 and 6 alternately faced loops, concave surfaces in the loops forming the damper rod passage 7a of the damper plate. 8 is a locking shoulder on the rod 2. This shoulder is formed by a sharp bend in the rod. The damper is placed in a pipe 9, the rod forced through the wall of the ingoing side of the pipe making an opening 10. The end of the rod is entered in the passage 7a and the rod passed inwardly through the opening 10 until the bent shoulder reaches the opening as shown in Fig. 2. Here it is necessary, unless the hole opening is unduly enlarged, to follow around the bend by tilting the damper, as indicated in Figs. 3 and 4. In this way the axis of the rod at each point in the bend may be retained in approximate alignment with the axis of the opening and consequently the entry may be made through an opening having closely the dimension of the rod. This makes a better bearing for the rod than the larger opening. After the shoulder has entered the pipe the damper is brought to a position bringing the passage directly across the pipe as nearly right angles to the axis of the pipe as possible. In the present invention the distance between the rear of the shoulder and the end of the rod is such that the rod may be turned down to this directly crosswise position before the point is forced into the pipe, as shown in Fig. 5. This would make the length of rod between the rear of the shoulder and the end of the rod not greater than the diameter of the plate plus the plate clearance, this clearance being substantially standard, as, for instance, a damper measuring actually 5½″ is a standard 6″ damper. In this way the point may be worked through the wall at the outgoing side of the pipe making as small an opening 11 as is consistent with the size of the rod.

The shoulder 8 as it passes the first loop must be given a half turn so that it may pass through the open side of the second loop or locking loop 5. The damper is provided with an enlargement of the passage 7a to permit the turning of the shoulder. As shown, the enlargement is formed by an opening 7b extending entirely through the plate. After the rod has passed the locking loop it is again given a half turn which brings the shoulder opposite a locking surface 5a in the locking loop. In order that the shoulder may be turned after passing the locking loop, the rod passage 7a is enlarged at 7 in order to permit the shoulder to turn. As shown, the enlargement is in the form of an opening extending entirely through the plate. The rod is then retracted bringing the shoulder into engagement with the locking surfaces so as to lock the plate with the rod. This retractive movement is accomplished by spring 12. The loops at the opposite edges of the damper correspond so that the rod may be entered from either edge of the damper plate and locked in the manner of the Massing patent, if desired.

As the rod emerges from the loop 4 the shoulder 8 must be given a half turn to clear the loop 5. It will be understood that the damper at this time is inside of the pipe and not readily observable. In order to assist the operator in making the half turn I have provided a guiding projection 13 on the ingoing or outer edge of the loop 5. This projection has the guiding surfaces 14 which, when engaged by the shoulder 8 tends to rotate the rod as it is passed inwardly. Without such camming action, and with the direct engagement of the shoulder 8 with the incoming edge of the loop 5 the operator is apt to become confused and have trouble in completing the insertion of the rod. Similarly on a return movement of the rod there may be confusion by the engagement of the shoulder 8 with the outgoing or inner edge of the loop 4 and I therefore provide the inner edge of the loop with a guiding projection 15 having guiding surfaces 16 operating in the manner of the guiding projection 13.

What I claim as new is:

1. In a damper, the combination of a pipe having damper rod perforations therein; a damper rod having a shoulder formed by a bend in the rod extending through the perforations in the pipe; and a damper plate having a passage for receiving the rod, said passage having space for the entry and turning of the shoulder, and a locking seat for the shoulder when turned, said shoulder being spaced from the adjacent edge of the damper a distance at least equal to the penetration of the rod through the opposite side of the pipe, the rod having a length from the rear of the shoulder to the end of the rod not greater than the diameter of the pipe whereby the entering of the shoulder through the pipe perforation may be completed without interference between the end of the rod with the outgoing wall of the pipe.

2. In a damper, the combination of a damper rod having a shoulder formed by a bend of the rod; and a damper plate having a passage for receiving the rod, said passage having space for the entry and turning of the shoulder, and a locking seat for the shoulder when turned, the diameter of damper plate plus its size clearance being at least equal to the length of the rod from the rear of the shoulder to the end of the rod.

CARL R. ANDERSON.